United States Patent [19]

Lee et al.

[11] 4,235,717
[45] Nov. 25, 1980

[54] PROCESS FOR DESALTING AN AQUEOUS CAUSTIC SOLUTION

[75] Inventors: John M. Lee; William C. Bauman, both of Lake Jackson, Tex.

[73] Assignee: The Dow Chemical Company, Midland, Mich.

[21] Appl. No.: 944,688

[22] Filed: Sep. 22, 1978

[51] Int. Cl.³ .............................................. C02F 1/42
[52] U.S. Cl. ..................................... 210/685; 423/181
[58] Field of Search ............... 210/37 R, 37 B, 38 R, 210/38 A, 38 B, 38 C; 260/886; 521/28

[56] References Cited

U.S. PATENT DOCUMENTS

| | | | |
|---|---|---|---|
| 3,041,292 | 6/1962 | Hatch | 521/28 |
| 4,119,508 | 10/1978 | Yokota et al. | 210/38 A |
| 4,150,205 | 4/1979 | Wheaton | 260/886 |
| 4,154,801 | 5/1979 | Wheaton | 423/181 |

*Primary Examiner*—Ivars C. Cintins
*Attorney, Agent, or Firm*—W. J. Lee

[57] ABSTRACT

Ion retardation resins particularly useful for desalting caustic solutions are prepared by employing ion exchange resins consisting essentially of a mixture of a reticular, insoluble, cross-linked styrene/divinylbenzene copolymer with an entrapped non-leachable polymer of acrylic acid contained therein and where the amount of carboxylic acid groups on the polyacrylic acid are in substantial excess over the amount needed to react with all the quaternary ammonium groups which are nuclear substituted on the styrene copolymer chains.

6 Claims, 8 Drawing Figures

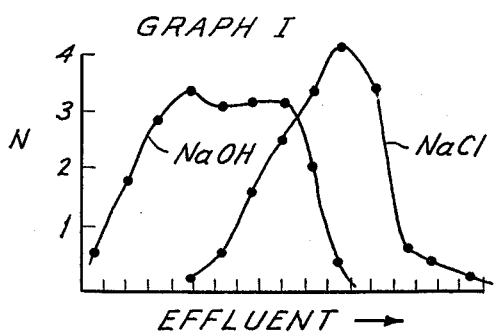
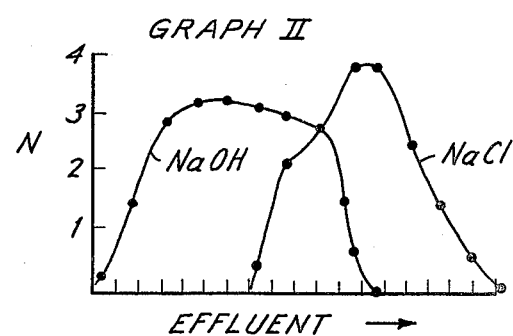
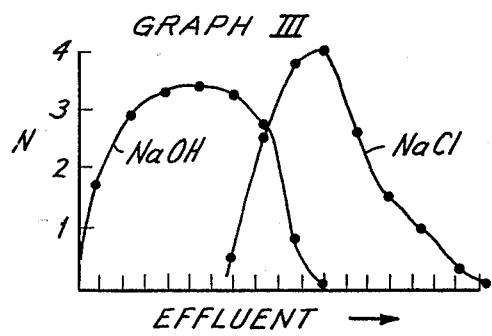
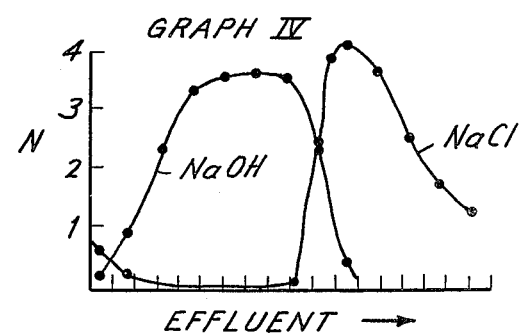
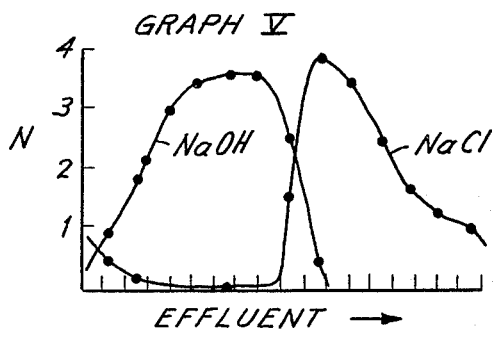
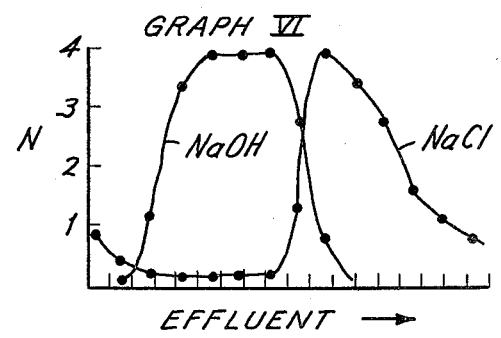
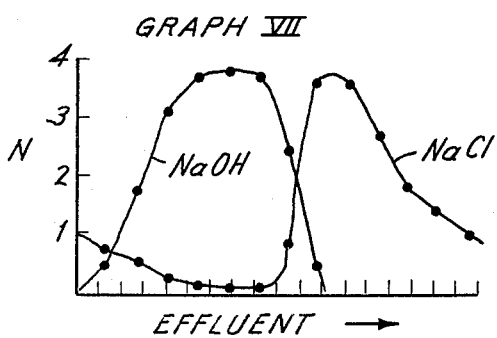
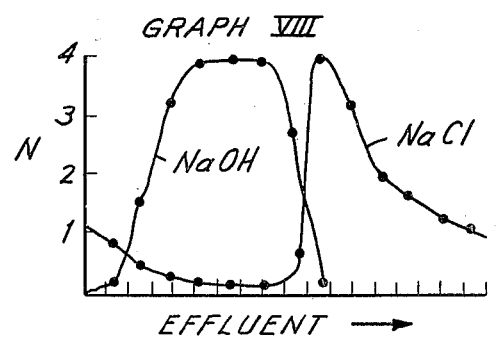

PROCESS FOR DESALTING AN AQUEOUS CAUSTIC SOLUTION

BACKGROUND OF THE INVENTION

Ion retardation, using "snake-cage polyelectrolytes", is discussed in an article in Industrial and Engineering Chemistry, Vol. 49, No. 11, November 1957 (pp 1812–1819), titled "Preparation and Use of Snake-Cage Polyelectrolytes" by Melvin J. Hatch, John A. Dillon, and Hugh B. Smith. It is disclosed there that a "snake-cage resin" is a cross-linked polymer system containing physically trapped linear polymer. For example, acrylic acid, when polymerized in situ within the reticules of a cross-linked copolymer of styrene and divinylbenzene (DVB), forms a "caged snake" of polyacrylic acid. Ordinarily polyacrylic acid is soluble in alkaline aqueous solutions, but, when entrapped within the styrene DVB copolymer bead, does not dissolve out of its "cage". The article discloses, e.g., the use of Dowex 1 ion exchange resin with entrapped polyacrylic acid as a resin which is more selective for NaCl than for NaOH.

Preparation of the Dowex 1 ion exchange resin is reported in the literature as comprising the polymerization of styrene containing divinylbenzene (DVB) as a crosslinker. The amount of crosslinking is about 8%±0.5%. The cross-linked styrene-DVB copolymer is chloromethylated in a Friedel-Crafts condensation employing, e.g., as catalyst, anhydrous $AlCl_3$, $ZnCl_2$, or $SnCl_2$. The chloromethyl groups ($-CH_2Cl$) attached to phenyl rings along the polymer structure are quaternized by reaction with a tertiary alkyl amine, trimethylamine, thus forming ion-exchange groups along the polymer chain which may be illustrated by the following empirical structure:

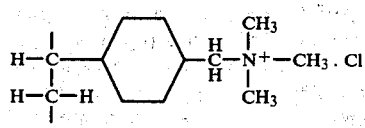

The resin particles are substantially spherical, generally have a standard mesh size (wet) of 20–50, and have a density (wet with 43% moisture content) of about 44 lb./ft.³. Ordinarily the total exchange capacity ($Cl^-$ form) is about 3.5 meq./mg. (dry basis) and about 1.33 meq./ml. (wet basis).

U.S. Pat. No. 3,041,292 by Melvin J. Hatch also discloses ion exchange resins having entrapped polyacrylic acid. U.S. Pat. Nos. 3,078,140; 3,205,184; and 3,332,890, which are all continuation-in-parts of U.S. Pat. No. 3,041,292, also contain information relevant to the present invention. Canadian Pat. No. 575,049 also contains relevant information. U.S. Pat. No. 2,606,098 (alkali metal hydroxide method) and U.S. Pat. No. 3,228,275 (countercurrent working procedure) are somewhat related to the present subject matter.

Of the ion retardation resin systems disclosed in the above references which may be useful in desalting caustic, it is the type exemplified by commercially-available Dowex 1 ion exchange resin (with polyacrylic acid entrapped therein) which is of pertinence in the present invention. The various Dowex ion exchange resins are registered tradenames of The Dow Chemical Company.

Dowex 1 ion exchange resin is a strongly basic anion exchanger formed by co-polymerizing styrene with divinylbenzene (DVB) as a crosslinker and featuring, as nuclear substituents on the polymer chain, trimethyl benzyl ammonium quaternary salts. The resin is commercially available in the $Cl^-$ or $OH^-$ form, but for the present invention, the $Cl^-$ form is preferable.

In preparing the pertinent polyacrylic acid snake-cage resins, the ion exchange resin is filled with monomeric acrylic acid, then the acrylic acid is polymerized in situ in the exchange resin. The polymerization may be initiated or catalyzed by the use of a free radical catalyst, a redox catalyst, and/or by increasing the temperature to overcome the inhibitors normally used in stored acrylic acid.

Whereas the art suggests the use of various amounts of acrylic acid polymer to be used with a given amount of quaternary ammonium groups, the teachings suggest that a stoichiometric balance between the carboxylic groups and the quaternary ammonium groups is preferred in order that there be no substantial excess of either one when the resin is to be employed in desalting caustic.

SUMMARY OF THE INVENTION

We have now found, unexpectedly, that when a Dowex 1 type of ion exchange resin (containing entrapped polyacrylic acid) is used for desalting caustic, that the desalting efficiency is enhanced by employing a resin which has no quaternary ammonium groups which are not complexed with carboxyl groups of a polyacrylic acid and which have an excess of carboxylic groups in the range of about 0.4 to about 1.0 meq./ml. of resin, especially about 0.5 to about 0.75 meq./ml. of resin.

DETAILED DESCRIPTION OF THE INVENTION

The attached drawings (Graphs I–VIII) depict curves of data obtained as shown in the Examples.

The "snake-cage" resins of the present invention, also known as "ion-retardation resins", which involve polymerization of acrylic acid inside Dowex 1 type of ion exchange resin beads are prepared according to published methods taught, e.g., in U.S. Pat. No. 3,041,292. Such resins are characterized as a bead form of polystyrene containing about 8% crosslinking with divinyl benzene and having nuclear substituted quaternary trialkyl ammonium groups, wherein said quaternary ammonium groups are neutralized by carboxylic acid groups which are pendant on chains of polyacrylic acid entrapped within the resin beads. The principal distinguishing feature of the resins used in the present invention is that the amount of polyacrylic acid incorporated into the resin, by the in-situ polymerization of acrylic acid, is controlled so as to provide enough carboxylic groups to complex with all the quaternary ammonium groups of the ion exchange resin and to have a large excess of carboxylic groups.

We would not wish the present invention to be prejudiced by the following postulated explanation, but it is believed that when the polyacrylic acid is formed in the ion exchange resin, the pendant carboxylic groups do not all align themselves in such a way that each one is able to "reach" one of the quaternary ammonium groups and thereby react or neutralize the quaternary ammonium groups; thus an excess is needed so as to assure complete neutralization of the quaternary ammonium groups. This leaves some of the —COOH groups in the unreacted state, but as long as these excess carboxylic groups are controlled within a critical range of concentration, then unexpected beneficial improvements are attained.

When essentially all of the quaternary ammonium groups are neutralized or complexed with —COOH groups on the non-leachable acrylic acid polymer, the expression $\Delta C^+ = 0$ meq./ml. capacity is used. The expression $\Delta C^- = X$ meq./ml. capacity, where X is a positive integer, is used to indicate the amount of —COOH groups which are not complexed or reacted with a quaternary ammonium group. Effectively, the value of $\Delta C^-$ is the stoichiometric excess of COOH groups over the quaternary amine groups. In the present invention it is critical that $\Delta C^+ = 0$ and that $\Delta C^- = X$, where X is about 0.4 to about 1.0 meq./ml., preferably about 0.5 to about 0.75 meq./ml. Any $\Delta C^+$ value of less than about 0.005 is considered to be essentially zero as a practical matter.

The criticality of the above $\Delta C$ values in achieving the unexpected benefits of the present invention is evidenced by the data in the examples shown in this disclosure. Where $\Delta C^+$ capacity is greater than zero, a salt-free NaOH is not attained, even if $\Delta C^-$ capacity is within the critical range. Where $\Delta C^+ = 0$, but $\Delta C^-$ is below about 0.4 meq./ml. the NaCl wash-out rate is slow; above about 1.0 meq./ml., the separation capacity is decreased as shown by an earlier rise of the NaCl concentration.

As stated previously, the present invention involves the use of the particularly described ion exchange resin in a process for desalting caustic, e.g., the separation of NaCl from aqueous solutions of NaOH. Of particular interest are cell effluents from electrolytic chlorine-caustic diaphragm cells where catholyte withdrawn from the cell, as cell effluent, contains NaOH product contaminated by NaCl. It is usually necessary for commercial and technical reasons to reduce the NaCl to as low a level as is feasibly possible. The present invention affords a method for producing aqueous NaOH having very low salt levels, so low in fact that when the NaOH is concentrated to high concentrations of 50–70%, no precipitation of NaCl is encountered.

One of the benefits of the present invention is that with the high $\Delta C^-$ capacity, assuring that $\Delta C^+ = 0$, a rapid Cl$^-$ wash-out (a sharp trailing Cl$^-$ gradient) is obtained which yields a high NaCl concentration in the effluent; this allows the use of less water per ton of NaOH produced.

It will be appreciated and understood by practitioners of the relevant arts, having read this disclosure, that the ion exchange resins of the present invention are highly effective in absorbing chloride and chlorate ions from aqueous alkali metal hydroxide solutions, thereby permitting the recovery of a purified alkali metal hydroxide solution. The absorbed anion impurities can thereafter be washed from the composite resin bodies so as to regenerate the same, and the process can be repeated in alternating absorption and regeneration cycles.

In standard practice, the ion exchange resin is placed in a vessel, usually an elongated vertically-disposed vessel, equipped with at least one flow means at, or near, the top and also at, or near, the bottom. The aqueous stream to be treated may be fed through the resin bed from the bottom or from the top, but is preferably fed from the bottom. Also, the wash liquid employed to regenerate the resin by washing out the absorbed material may be fed through the resin from the bottom or from the top. Thus, the wash cycle may be co-flow or counter-flow to the absorption cycle. We prefer, in the practice of the present invention to employ counter-flow cycles by feeding the NaCl-containing NaOH solution from the bottom until NaCl begins to show up in the effluent stream leaving the top, then flowing the wash liquid through the resin from the top and taking the eluted NaCl out the bottom. By using the counter-flow alternate cycles, a better separation is attained which economizes on the amount of water involved and which deals more efficiently with the "tailings" or "hold-up" in the resin bed which remains after each cycle.

Whereas the present invention provides a means, e.g., for substantially removing NaCl from NaOH solutions, by passing the solution through a single stage of NaCl removal, further improvement in the NaCl separation may be desired and is possible by passing the NaOH solution through a second stage, such as through a second resin bed, to even further reduce the NaCl content. With two stages of resin treatment a NaCl-containing NaOH solution, e.g., a chlorine cell effluent, is effectively purified to a chloride level of less than 10 ppm. The technique is useful, in general, for desalting of caustic solutions.

The temperature employed for the desalting of caustic may be from about 0° C. to about 100° C., and is preferably about 30° C. to about 60° C. At temperatures much above about 60° C., the effective life of the resin may be decreased because of degradation of the quaternary groups. At temperatures below about 30° C., the rate is relatively slow and therefore not usually economical. Most preferably, the temperature is in the range of about 45° C. to about 55° C.

EXAMPLES I–VIII

A number of "snake-cake" resins are prepared by the published method of polymerizing acrylic acid insitu in Dowex 1 ion exchange beads, using various amounts of acrylic acid. Then the resins are washed well with water to remove any leachable monomeric, dimeric or oligomeric acrylic acid. The exchange capacities are determined essentially by the method described in page 1819 of Hatch, et al article in Vol. 49, No. 11 of Industrial and Engineering Chemistry identified supra.

For these examples, the NaCl-containing NaOH solution is the cell effluent (catholyte flow) from an electrolytic diaphragm chlor-alkali cell. The cell effluent is passed through the following identified resins and the absorbed NaCl values are then eluted with a water wash cycle.

The resins, shown in the attached graphs of the same Roman Numerals, are measured as follows:

| Resin No. | Capacity in Meq./ml. (wet basis) $\Delta C^+$ | $\Delta C^-$ | Within Scope of Present Invention |
|---|---|---|---|
| I | 0 | 1.60 | no |
| II | 0 | 1.034 | yes |
| III | 0 | 0.75 | yes |
| IV | 0 | 0.44 | yes |
| V | 0 | 0.55 | yes |
| VI | 0.17 | 0.45 | no |
| VII | 0.013 | 0.334 | no |
| VIII | 0.075 | 0.03 | no |

A water jacketed column of 116 cc capacity is filed with the wet resin sample. Water is circulated in the jacket from a controlled bath to maintain the column at 60° C. A continuous flow of, alternately, cell effluent and water is maintained at 3.3 cc/minute. The cell effluent is 3.15 N NaOH and 2.76 N NaCl. After 16.17 minutes of cell effluent flow, a water flow of 18.72 minutes is then followed with cell effluent and then water again in alternate cycles. Monitoring the column effluent in small increments for alkalinity, chloride, and density give the representative curves as shown in the attached graphs, the graphs being numbered to coincide with the Resin No. shown above.

In Graphs I-VIII, the normality (N) of the effluent flows from the resin are plotted. In Graphs II, III, IV, and V, which represent examples within the scope of the presently claimed invention, the separation of NaOH and NaCl is seen to be better than in comparative Graphs I, VI, VII, and VIII. In Graph I the "breakthrough" of the NaCl is seen to occur significantly sooner than in Graphs II, III, IV, and V. In Graphs VI, VII, and VIII it is seen that the level of NaCl concentration throughout the NaOH collection is significantly higher than in Graphs II, III, IV, and V.

EXAMPLE IX

Counterflow-Operation

Cell effluent (8.77% NaOH, 14.9% NaCl) is passed upwardly through a bed of ion retardation resin contained in an elongated vertically-disposed vessel at 60° C. The resin capacity is: $\Delta C^+ = 0.002$ (essentially nil) and $\Delta C^- = 0.51$ meq./ml. The amount of cell effluent passed through is considered as "one volume". The caustic effluent taken out overhead (0.9 volume) contains 10.47% NaOH and 0.088% NaCl. Then 1.25 volumes of deionized recycle water (0.3% NaOH, 0.028% NaCl) is passed downwardly through the resin bed at 60° C. to wash the NaCl from the resin and 1.35 volumes of a saline effluent (0.43% NaOH, 12.9% NaCl) is removed from the bottom. The amount of NaOH in the saline effluent is about 5.7% of the NaOH which was in the cell effluent. If desired, the NaOH in the saline effluent may be substantially recovered by further ion exchange treatment or sent to some other process or treatment.

The NaCl content in the caustic effluent may be further reduced by giving the caustic effluent a second treatment with the same or similar resin as was used in the first treatment described above.

EXAMPLE X

Co-flow Operation

One volume of a cell effluent (8.0% NaOH, 16.0% NaCl, 106 ppm $ClO_3^-$, 1650 ppm $SO_4^=$) is passed downwardly at 50° C. through a bed of resin similar to the resin of Example IX above. The caustic effluent from the bottom of the resin bed is 0.9 volume and contains 9.8% NaOH, 0.5% NaCl, 20 ppm $ClO_3^-$ and 2200 ppm $SO_4^=$. Then 2.8 volumes of softened river water (61 ppm $SO_4^=$, 1 ppm $Ca^{++}$) is passed downwardly through the resin bed to wash the NaCl from the resin. The saline effluent (2.9 volumes) from the bottom of the resin bed contains 0.1% NaOH, 6.5% NaCl, 43 ppm $ClO_3^-$ and 25 ppm $SO_4^=$. The amount of NaOH in the saline effluent is about 4% of the amount in the cell effluent feed. Note in this Example, as compared with Example IX, that the amount of water needed to achieve good wash-out of the resin is much greater.

The foregoing Examples are to illustrate particular embodiments of the present invention, but the invention is not limited to those particular embodiments.

We claim:

1. In a process for desalting an aqueous caustic solution, said process comprising contacting the aqueous solution with an ion exchange resin, said resin being characterized as a bead form of polystyrene containing about 8% crosslinking with divinylbenzene and having nuclear substituted quaternary trialkyl ammonium groups, wherein said quaternary ammonium groups are neutralized by carboxylic acid groups which are pendant on chains of polyacrylic acid entrapped within the resin beads, the improvement which comprises the use of such an ion exchange resin wherein there is a sufficient amount of acrylic acid groups on the polyacrylic acid to not only neutralize the quaternary ammonium groups to give an exchange capacity of $\Delta C^+ = 0$, but also enough carboxylic groups to give an exchange capacity of $\Delta C^- = X$, where X is from about 0.4 to about 1.0 meq./ml. of resin.

2. The process of claim 1 wherein the salt-containing caustic solution is cell effluent from an electrolytic diaphragm chlorine cell, said cell effluent containing NaCl and NaOH.

3. The process of claim 1 wherein the value of X, in the formula $\Delta C^- = X$, is in the range of about 0.5 to about 0.75.

4. The process of claim 1 wherein the caustic solution coming from the ion exchange resin is conveyed to a second vessel containing another portion of the resin and is passed through the resin until the salt-loading capacity of the resin is reached.

5. The process of claim 1 when done at a preferred temperature in the range of about 30° to about 60° C.

6. The process of claim 5 wherein the preferred temperature is 45° C. to 55° C.

* * * * *